United States Patent [19]

Miyake et al.

[11] Patent Number: 4,471,103

[45] Date of Patent: Sep. 11, 1984

[54] TWO-PACKAGE TYPE PRESSURE-SENSITIVE ADHESIVE COMPOSITION PREPARED FROM A POLYURETHANE CONTAINING A TERMINAL-FREE ISOCYANATE GROUP AND AN OXADIAZINE-2,4,6-TRIONE RING

[75] Inventors: Jun-ichi Miyake; Kyuya Yamazaki; Yoshio Kamatani, all of Osaka, Japan

[73] Assignee: Takeda Chemical Industries, Ltd., Osaka, Japan

[21] Appl. No.: 445,095

[22] Filed: Nov. 29, 1982

[30] Foreign Application Priority Data

Dec. 10, 1981 [JP] Japan ................................ 56-199536

[51] Int. Cl.$^3$ ............................................ C08G 18/77
[52] U.S. Cl. ...................................... 528/65; 528/66; 528/73
[58] Field of Search .............................. 528/65, 66, 73

[56] References Cited

U.S. PATENT DOCUMENTS 3,730,953  5/1973  Naito et al. ........................... 528/45

Primary Examiner—Maurice J. Welsh
Attorney, Agent, or Firm—Antonelli, Terry & Wands

[57] ABSTRACT

Disclosed in a two-package type pressure-sensitive adhesive composition which comprises (1) a polyol component having an average molecular weight of about 500 to 100,000 and (2) a polyurethane having terminal free isocyanate group obtained by the reaction of an isocyanate component having oxadiazine-2,4,6-trione ring and a polyol component having an average molecular weight of about 62 to 500 and if necessary, other organic diisocyanate at a specific proportion. The composition has an excellent heat resistance and stable pressure-sensitive adhesion.

21 Claims, No Drawings

TWO-PACKAGE TYPE PRESSURE-SENSITIVE ADHESIVE COMPOSITION PREPARED FROM A POLYURETHANE CONTAINING A TERMINAL-FREE ISOCYANATE GROUP AND AN OXADIAZINE-2,4,6-TRIONE RING

This invention relates to a two-package type polyurethane pressure-sensitive adhesive composition.

Conventionally, as pressure-sensitive adhesive compositions, there are rubber adhesive compositions which are mainly composed of natural rubber or synthetic rubber and acrylic ones which are mainly composed of polyacrylic esters. However, urethane pressure-sensitive adhesive compositions have not yet been commercially sold.

This is because in the case of urethane pressure-sensitive adhesives it is necessary to produce suitable tackiness, adhesion and cohesion together by the reaction of isocyanate group and hydroxyl group while since the reaction of isocyanate group and hydroxyl group is liable to be affected by the working atmosphere such as temperature, humidity, etc., it is very difficult to obtain suitable tackiness and adhesion and furthermore since there are problems of short pot life and difficulty in selection of catalysts, it is impossible to obtain pressure-sensitive adhesives having stable performance.

On the other hand, commercially available rubber and acrylic pressure-sensitive adhesives require solvents in large amount and so have the problems of environmental pollution and bad smell developed by unreacted acrylic monomers. Therefore, much expense is required for overcoming there problems to cause increase in cost of the adhesives.

The present inventors have studied, for a long time, preparation and use of isocyanate component having oxadiazine-2,4,6-trione ring obtained by the reaction of polyisocyanate and carbon dioxide. As a result, it has been found that a two-package type polyurethane composition which uses, as a curing agent, a polyurethane having terminal free isocyanate group obtained by reacting said isocyanate component with a polyol component at a specific proportion and a polyol component as a main component has excellent heat resistance and provide stable pressure-sensitive adhesion and furthermore can much increase percentage of solid matter in the composition than the conventional ones.

This invention relates to a two-package type pressure-sensitive adhesive composition which contains (1) a polyol component and (2) a polyurethane having terminal free isocyanate group obtained by the reaction of an isocyanate component having oxadiazine-2,4,6-trione ring and a polyol component and if necessary other organic diisocyanate at such a proportion that the number of oxadiazine-2,4,6-trione ring/the total number of free isocyanate group is in the range of $\frac{1}{2}$ to 1/20 and (the number of oxadiazinetrione ring + the total number of free isocyanate group)/the number of hydroxyl group of polyol component is at least 1.0, the proportion of the polyol component (1) and the polyurethane (2) being such that the number of hydroxyl group of the polyol component (1)/[the number of free isocyanate group of the polyurethane (2)+the number of oxadiazinetrione ring] is in the range of 1.0 to 10.

As the polyol component (1) used in this invention, there may be suitably used polyester polyols, polyether polyols, polyether-ester polyols, polyester-amide polyols, acrylic polyols, polyurethane polyols, polyhydroxyalkanes or mixtures thereof.

Examples of said polyester polyols are reaction products of polyhydric alcohols and polybasic acids. As the polyhydric alcohols, mention may be made of ethylene glycol, propylene glycol, butylene glycol, hexylene glycol, neopentyl glycol, cyclohexanedimethanol, diethylene glycol, triethylene glycol, polyethylene glycol, dipropylene glycol, polyoxypropylene glycol, polyoxybutylene glycol, glycerol, trimethylolpropane, pentaerythritol, sorbitol, etc. As the polybasic acids, mention may be made of succinic acid, adipic acid, azelaic acid, sebacic acid, phthalic acid, isophthalic acid, terephthalic acid, tetrahydrophthalic acid, hexahydrophthalic acid, maleic acid, fumaric acid and anhydrides thereof, etc. Further suitable examples are polyester polyols obtained by ring opening polymerization of lactones such as caprolactone, methylcaprolactone, etc. with glycols, etc.

Examples of the polyether polyols are those which are obtained by polymerization of epoxide compounds such as ethylene oxide, propylene oxide, butylene oxide, tetrahydrofuran, styrene oxide, epichlorohydrin, phenylglycidyl ether, allylglycidyl ether, etc. in the presence of a catalyst such as boron trifluoride or by addition of these epoxide compounds alone or as a mixture or alternately to reactive hydrogen atom-containing initiators. As the reactive hydrogen atom-containing initiators, mention may be made of water, polyols such as ethylene glycol, propylene glycol, glycerol, trimethylolpropane, pentaerythritol, sorbitol, etc., amino alcohols such as ethanol amine, polyamines such as ethylenediamine, etc. Polyether polyamines may be used instead of polyether polyols.

As examples of the polyether-ester polyols, mention may be made of those which are obtained by subjecting said polyether polyols and polybasic acids to polyesterification reaction and besides those which have both the segments of polyether and polyester in one molecule and which are obtained by ring-opening copolymerization of epoxide compounds and acid anhydrides.

Examples of the polyester-amide polyols are those which are obtained by said polyesterification reaction where amino group-containing starting materials such as ethylenediamine, propylenediamine, hexamethylenediamine, xylylenediamine, hydrogenated xylylenediamine, ethanolamine, propanolamine, etc. are additionally used.

The hydroxyl group-containing polymers generally called acrylic polyols can be prepared by copolymerizing polymerizable monomers containing at least one hydroxyl group in one molecule with other monomers complymerizable with said monomers. As the hydroxyl group-containing monomers, mention may be made of hydroxyethyl acrylate, hydroxypropyl acrylate, hydroxybutyl acrylate, trimethylolpropane monoacrylate, their corresponding methacrylic acid derivatives, polyhydroxyalkyl maleate and fumarates, etc. As examples of the copolymerizable monomers, mention may be made of, for example, acrylic acid, its methyl, ethyl, propyl, butyl, 2-ethylhexyl esters, methacrylic acid, maleic acid, fumaric acid, itaconic acid and their esters as enumerated above and vinyl monomers such as styrene, α-methylstyrene, vinyl acetate, acrylonitrile, methacrylonitrile, etc.

As examples of polyurethane polyols, mention may be made of reaction products of polyols and polyisocyanates which have terminal hydroxyl group. Examples of the polyols are polyols such as ethylene glycol, propylene glycol, butylene glycol, hexylene glycol, neopentyl glycol, cyclohexanedimethanol, diethylene glycol, triethylene glycol, dipropylene glycol, glycerol, trimethylolpropane, pentaerythritol, sorbitol, etc. or polymer polyols such as polyester polyol, polyether polyol, polyester ether polyol, polyester amide polyols, etc. As the polyisocyanates, mention may be made of aliphatic, alicyclic, aromatic and aromatic-aliphatic organic diisocyanates such as tetramethylene diisocyanates, hexamethylene diisocyanate, 2,6-diisocyanatomethylcaproate, 3-isocyanatomethyl-3,5,5-trimethylcyclohexyl isocyanate, 4,4'-methylenebis(cyclohexyl isocyanate), 1,3- or 1,4-bis(isocyanatomethyl)cyclohexane, methylcyclohexane-2,4-diisocyanate, m- or p-phenylene diisocyanate, diphenylmethane-4,4'-diisocyanate, 2,4- or 2,6-tolylene diisocyanate, 1,3- or 1,4-xylylene diisocyanate or dimers, trimers, etc. of these polyisocyanates. Furthermore, reaction products of said polyisocyanates with said polyols a part of which is substituted with a low molecular polyol such as ethylene glycol, propylene glycol or a low molecular amino compound such as ethylenediamine, propylenediamine, hexamethylenediamine, xylylenediamine, bisaminomethylcyclohexane, 3-aminomethyl-3,5,5-trimethylcyclohexylamine, ethanolamine, propanolamine, etc. may also be used as the polyurethane polyols.

Examples of the polyhydroxyalkanes are hydrolyzed products of vinyl acetate homopolymers or copolymers of vinyl acetate with other ethylenic copolymerizable monomers and polybutadiene polyols.

Not only the hydroxy group-containing compounds of relatively high molecular weight mentioned above, but low-molecular weight polyols having a molecular weight of about 62 to 400 may be used as mixtures.

Of these polyol components (1), especially preferred are polyether polyols, acrylic polyols and polyurethane polyols. They have preferably a relatively high molecular weight, namely, an average molecular weight of about 500 to 100,000, especially about 1,000 to 10,000. Use of a polyol having an average molecular weight of less than 500 cannot give sufficient tackiness to the composition. While, use of a polyol having an average molecular weight of more than 100,000 provides poor workability because the composition has too high viscosity. The polyurethane (2) having terminal free isocyante group used in this invention can be obtained by reacting an isocyanate component having oxadiazine-2,4,6-trione ring and a polyol component and if necessary, other organic diisocyanate.

The isocyanate component having oxadiazine-2,4,6-trione ring used in this invention can be obtained, for example, by the reaction of isocyanate with carbon dioxide.

As examples of the isocyanates, there are aliphatic, alicyclic and aromatic-aliphatic polyisocyanates such as tetramethylene diisocyanate, hexamethylene diisocyanate, ω,ω'-diisocyanatodipropyl ether, 2,6-diisocyanatocaproic acid ester, 1,6,11-triisocyanatoundecane, bis(isocyanatomethyl)cyclohexane, bis-(isocyanatoethyl)cyclohexane, 1-isocyanato-3-isocyanatomethyl-3,5,5-trimethylcyclohexane, bis(4-isocynatocyclohexyl)methane, xylylene diisocyanate, bis(2-isocyanatoethyl)benzene, etc. These polyisocyanates may be used alone or as a mixture thereof.

The reaction of the isocyanate with carbon dioxide is carried out in the presence of a catalyst. As the catalyst, tertiary phosphines, arsenic compounds and hydroquinones may be used and the tertiary phosphines are especially effective. When an isocyanate having oxadiazinetrione ring has been obtained by the reaction of an isocyanate with carbon dioxide, the reaction product may be used, as it is, as the isocyanate component of this invention, but usually various compounds are preferably added thereto for termination of the reaction and stable preservation of the product. Such reaction terminators and stabilizers include alkylating agents, acylating agents, acids, ester derivatives, phenols, peroxides, sulfur, polysulfides, metal sulfides, halogens, etc. Especially, the isocyanate component having oxadiazinetrione ring to which is added an additive selected from peroxides, sulfur, polysulfides, metal sulfides and halogens is preferred because the reaction of oxadiazinetrione ring and isocyanate with hydroxyl group of polyol component smoothly proceeds.

In the preparation of the isocyanate component having oxadiazinetrione ring from polyisocyanate and carbon dioxide, adducts having terminal NCO group may also be used as the polyisocyanate. Such adducts can be obtained by reacting polyisocyanates with low molecular weight polyol compounds having a molecular weight of not more than 500 (e.g., ethylene glycol, propylene glycol, 1,4-butanediol, glycerine, trimethylolpropane, etc.) or low molecular weight polyamine compounds (e.g., ethylenediamine, hexamethylenediamine, phenylenediamine, etc.) in an excess ratio of NCO group to active hydrogen of the polyol or polyamine compounds. Polyisocyanates, the isocyanate groups of which are partially blocked with a blocking agent and those having partially dimerized or trimerized NCO groups may also be used as the polyisocyanates.

Of the isocyanate components having oxadiazine-2,4,6-trione ring enumerated above, those which are derived from hexamethylene diisocyanate, 3-isocyantomethyl-3,5,5-trimethylcyclohexyl isocyanate or bis-(isocyanatomethyl)cyclohexane provide compositions especially excellent in adhesion performance and curability.

When said isocyanate component having oxadiazine-2,4,6-trione ring contains unreacted isocyanate monomers, low functional substances, etc. and, therefore, is unsuitable to use as it is, it is also possible to remove the monomers, low functional substances, etc. by appropriate methods such as distillation, extraction, crystallization, etc.

Said isocyanate components may be those having one or two or more oxadiazine-2,4,6-trione rings in the molecule or mixtures thereof.

The polyol component (1) may be used as the polyol component to be reacted with the isocyanate component having oxadiazine-2,4,6-trione ring. Especially, those which have a relatively low molecular weight, namely, an average molecular weight of about 62 to about 500 are preferred. In case of an average molecular weight exceeding 500, there is only obtained a composition inferior in adhesion because of lack of cohesion. As examples of these low molecular weight polyols, mention may be made of ethylene glycol, propylene glycol, butylene glycol, hexylene glycol, neopentyl glycol, cyclohexanedimethanol, glycerol, trimethylolpropane, pentaerythritol, diethylene glycol, triethylene glycol, dipropylene glycol, etc.

Use of a relatively high molecular weight polyol as the polyol component (1) and a relatively low molecular weight polyol as the polyol component for the polyurethane (2) is especially preferred because in this case the part of allophanate bond formed from oxadiazine-2,4,6-trione ring in the pressure-sensitive adhesive composition is a hard segment and the part of the polyol component (1) is a soft segment. Therefore, the composition obtained has a high cohesion and a suitable tackiness.

The organic diisocyanates other than the isocyanate component having oxadiazine-2,4,6-trion ring, if used, include those of aliphatic, alicyclic, aromatic and aromatic-aliphatic which are used for production of the polyurethane polyols of the polyol component (1) as mentioned hereinbefore.

The amount of the organic diisocyanates is such that (the total number of isocyanate groups in the isocyanate component having oxadiazinetrione ring and in organic diisocyanate)/the number of oxadiazinetrione ring is generally in the range of 2 to 20, preferably 5 to 15.

The reaction of the isocyanate component having oxadiazine-2,4,6-trione ring, the polyol component and if necessary, other organic diisocyanate is carried out at such a proportion that the number of oxadiazinetrione ring/the total number of free isocyanate group is in the range of ½ to 1/20, preferably 1/5 to 1/15 and (the number of oxadiazinetrione ring + the total number of free isocyanate group)/(the number of hydroxyl group of polyol component) is at least 1, preferably 1.2 to 3. When the ratio of the number of oxadiazinetrione ring/the total number of free isocyanate group exceeds ½, the composition has high degree of crosslinking and therefore the product obtained by curing has poor tackiness. When the above ratio is less than 1/20, the composition has too low degree of crosslinking and therefore it cannot provide sufficient holding power. In case of (the number of oxadiazinetrione ring + the total number of free isocyanate group)/(the number of hydroxyl group of polyol component) being less than 1.0, there is obtained a polyurethane having terminal hydroxy groups instead of terminal isocyanate groups.

This reaction is carried out under the conditions similar to those for the ordinary reaction of isocyanate group with hydroxyl group in the presence or absence of organic solvents. Known catalysts for formation of urethanes may be used for the reaction.

Examples of the organic solvents are esters such as ethyl acetate, butyl acetate, ethoxyethyl acetate, etc., ketones such as acetone, methyl ethyl ketone, methyl isobutyl ketone, etc., ethers such as tetrahydrofuran, dioxane, etc., halogenated hydrocarbons such as trichloroethane, trichloroethylene, ethylene dichloride, etc. and aromatic solvents such as toluene, xylene, etc.

Solid content of thus obtained polyurethane having terminal free isocyanate group is about 70 to 100% by weight. The two-package type pressure-sensitive adhesive composition of this invention is obtained by mixing this curing agent and said polyol component (1) as a main component by known methods.

The proportion of the main component to the curing agent is such that the number of hydroxyl group of the polyol component as the main component/(the number of free isocyanate group of the polyurethane as the curing agent + the number of oxadiazinetrione ring) is in the range of 1.0 to 10, preferably 1.2 to 5. When this ratio is more than 10, sufficient crosslinked structure cannot be obtained and the composition lacks cohesion. When less than 1.0, crosslinking reaction proceeds too much resulting in pressure-sensitive adhesives low in tackiness.

Solid content in the composition is about 60 to 90% by weight.

At the time of mixing of the curing agent with the main component, there may be added curing catalysts such as tertiary amines, tertiary phosphines, etc. tackifiers, plasticizers, antioxidants, UV stabilizers, pigments, etc.

As examples of the tertiary amines, mention may be made of azabicycloalkenes such as 1,5-diazabicyclo[5,4,0]-5-undecene, 1,5-diazabicyclo[4,3,0]-5-nonene, etc., chain or partially cyclic aliphatic polyamines such as N,N,N',N'-tetramethylethylenediamine, N,N,N',N'-tetramethyl-1,6-hexanediamine, N,N-bis(2-dimethylaminoethyl)methylamine, N-(2-dimethylaminoethyl)morpholine, N-methyl-N'-(2-dimethylaminoethyl)-piperazine, N,N,N'-trimethyl-N'-(2-hydroxyethyl)ethylenediamine, bis(2-dimethylaminoethoxy)methane, tetramethylguanidine, etc., cyclic monoamines such as quinuclidine, N,N'-dialkylpiperazines, N-alkylpiperizines, alkylation derivatives thereof, etc. Furthermore, salts of organic acids, amino acids or inorganic acids of said tertiary amines may also be used.

As the tertiary phosphines, aromatic and aliphatic tertiary phosphines may be used. Examples of these phosphines are triethylphosphine, tri-n-butylphosphine, dimethylphenylphosphine, triphenylphosphine, diethylcyclohexylphosphine, 1-ethylphospholine, 1-n-butylphosphane, 1,4-diphosphabicyclo[2,2,2]octane, tris(hydroxyethyl)phosphine, etc.

Said tertiary amines and tertiary phosphines act as catalysts for reaction of oxadiazinetrione ring and hydroxyl group. Amount of them can be optionally chosen depending on kind of polyurethane, curing conditions, pot life, etc. and usually is 0.001 to 10%, preferably 0.01 to 1% by weight of solid matter.

Said tertiary amines or phosphines may be mixed with the compositions at the time of use as a solution in suitable said organic solvents such as ethyl acetate, toluene, acetone, methyl ethyl ketone, etc. or may be added as they are to the compositions without dissolving them in solvents.

The curing catalysts may be mixed with either of the main component and the curing agent, but are preferably mixed with the former for preventing the curing agent from changing in its properties.

As examples of the tackifiers, mention may be made of rosin, terpene resin, cumarone resin, alkylphenol resin, terpenephenol resin, xyleneformaldehyde resin, aliphatic or aromatic petroleum resin, etc. These tackifiers may be mixed with the compositions at their use as a solution in suitable solvents such as ethyl acetate, toluene, methyl ethyl ketone, etc. Amount of these tackifiers to be added to the composition may be less than about 30% by weight of solid matter, preferably less than 15% by weight.

As the plasticizers, for example, dibutylphthalate, dioctyl phthalate, dioctyl adipate, etc. may be used.

Said tackifiers or plasticizers are preferably those which are low in reactivity with isocyanate.

Examples of the antioxidants are hydroquinone, 2,6-di-tert-butyl-4-methylphenol, etc. and examples of the UV stabilizers are 2,4-dihydroxybenzophenone, 2-(2'-hydroxy-5'-methylphenyl)benzotriazole, etc. For example, titanium oxide is used as the pigments.

A double-side adhesive tape may be prepared using the thus obtained two package type pressure-sensitive adhesive composition of this invention, for example, in the following manner. That is, the composition is coated on a release paper (e.g., glassine separator) by reverse-roll coater, kiss-roll coater or knife coater, solvent is removed at about 80° C. to 150° C. in about 0.5 to 5 minutes, then a base fabric such as non-woven fabrics, e.g., nylon, rayon, etc., foamed materials, e.g., polyethylene, polyurethane, rubbers, etc., Japanese paper, etc. is applied onto the coating, then the composition is directly coated on said base fabric in the same manner as on the release paper. Then, the coated fabric is dried and thereafter rolled. The coating thickness is usually in the range of about 25μ to 100μ (based on solid matter).

Excellent adhesion, holding power and tackiness of the composition of this invention can be obtained by using, as a curing agent, the polyurethane having terminal free isocyanate group obtained by reacting an isocyanate component having oxadiazine-2,4,6-trione ring with a polyol component under a specific condition. Such excellent effects cannot be obtained by using an isocyanate component having oxadiazine-2,4,6-trione ring as a curing agent and a polyol component as a main component as in the conventional technique.

The composition of this invention can be favorably used in the field of, for example, foamed materials such as polyethylene and polyurethane, plasticized polyvinyl chloride, etc.

The following examples will further illustrate this invention. The parts in the examples are by weight.

REFERENCE EXAMPLE 1

To 841 g of hexamethylene diisocyanate was added 1.8 g of tri-n-butylphosphine while introducing carbon dioxide thereinto at 40° C. and the reaction was carried out for 6 hours while stirring. Feeding of carbon dioxide was discontinued and 0.8 g of sulfur powder was added to the reaction product. The product was stirred for 30 minutes and then cooled. Starting materials were removed therefrom with a film evaporator to obtain 255 g of a somewhat viscous liquid of pale yellow. This product had an NCO content of 4.78 meq/g, oxadiazine-2,4,6-trione ring content of 2.77 meq/g and a residual monomer content of 0.4%.

REFERENCE EXAMPLE 2

To 971 g of 1,3-bis(isocyanatomethyl)cyclohexane was added 3.0 g of tri-n-butylphosphine while introducing carbon dioxide thereinto at 10° C. and the reaction was carried out for 5 hours under stirring. Then, carbon dioxide was replaced with nitrogen and 3.8 g of benzoyl peroxide was added to the reaction product, followed by stirring for 30 minutes. Starting materials were removed from the product by evaporation with a film evaporator to obtain 280 g of viscous liquid of pale yellow. This product had an NCO content of 4.35 meq/g, an oxadiazinetrione content of 2.22 meq/g and a residual monomer content of 0.8%.

EXAMPLE 1

A mixture of 100 parts of a butadiene homopolymer having hydroxyl groups at both terminals (average molecular weight 2,000, hydroxyl value 56.1 mgKOH/g and 90% of butadiene units constituting the polymer chain comprise 1,2-bond), 6 parts of a bifunctional polyether polyol (average molecular weight 3,000), 75 parts of a trifunctional polyether polyol (average molecular weight 5,000), 8 parts of diethylene glycol, 18 parts of tolylene diisocyanate (2,4-/2,6-=80/20 weight ratio), 0.04 part of 1,4-diazabicyclo[2,2,2]octane and 69 parts of ethyl acetate was reacted at 60° C. for 5 hours to obtain a main component, polyurethane polyol which had a viscosity of 20,000 cps (25° C.), a solid content of 75% and a hydroxyl value of 19.0 mgKOH/g.

A mixture of 50 parts of diethylene glycol, 54 parts of hexamethylene diisocyanate having oxadiazinetrione ring (2:1 adduct of hexamethylene diisocyanate and carbon dioxide), 100 parts of tolylene diisocyanate (2,4-/2,6-=80/20 weight ratio), 0.041 part of dibutyltin dilaurate and 51 parts of toluene was reacted at 60° C. for 4 hours to obtain a curing agent having a solid content of 80%.

A double-side adhesive tape was produced using a mixture of 100 parts of said main component, 7 parts of said curing agent, 0.1 part of 1,5-diazabicyclo[5,4,0]-5-undecene octylate as a catalyst and 27 parts of ethyl acetate. This tape was allowed to stand at 23° C. and 50% RH for 2 days and then subjected to adhesion test. (Sample A-1).

EXAMPLE 2

A main component acrylic polyol having an average molecular weight of 6000 (hydroxyl value 18.7 mgKOH/g) was prepared from 100 parts of 2-ethylhexyl acrylate, 66 parts of ethyl acrylate, 5 parts of 2-hydroxyethyl acrylate, 3.3 parts of 2-mercapto ethanol and 0.2 part of α,α'-azobisisobutyronitrile. With 100 parts of this acrylic polyol were mixed 7 parts of the curing agent used in Example 1, 0.1 part of 1,5-diazabicyclo[5,4,0]-5-undecene octylate as a catalyst and 69 parts of ethyl acetate. Using the resultant mixture a double-side adhesive tape was produced. This tape was allowed to stand at 23° C. and 50% RH for 2 days and then subjected to adhesion tests. (Sample B-1)

COMPARATIVE EXAMPLE 1

A mixture of 100 parts of a bifunctional polyether polyol (average molecular weight 3,000), 11.6 parts of tolylene diisocyanate (2,4-/2,6-=80/20 weight ratio), 0.02 part of 1,4-diazabicyclo[2,2,2]octane and 28 parts of toluene was reacted at 60° C. for 4 hours to obtain a curing agent having a viscosity of 600 cps (25° C.) and a solid content of 80%.

To 100 parts of the polyurethane polyol of Example 1 as a main component were added 30 parts of said curing agent, 10 parts of a tackifier (terpene phenol resin), 0.008 part of dibutyltin dilaurate and 33 parts of toluene, followed by mixing. In the same manner as in Example 1 double-side adhesive tapes were produced using the resultant mixture. These tapes were allowed to stand for 2 days under three conditions of 23° C., 50% RH (Sample F-1), 45° C., 50% RH (Sample F-2) and 45° C., 90% RH (Sample F-3) and then subjected to adhesion tests.

EXAMPLE 3

With 100 parts the acrylic polyol (average molecular weight 6000 and hydroxyl value 18.7 mg KOH/g) obtained in Example 2 were mixed 10 parts of a bifunctional polyether polyol (average molecular weight 3,000) and 73.3 parts of ethyl acetate to obtain a main component having a solid content of 60% and a hydroxyl value of 12.2 mg KOH/g.

A mixture of 8 parts of trimethylol propane, 22 parts of dipropylene glycol, 40 parts of 1,3-bis(isocyanatomethyl)cyclohexane having oxadiazinetrione ring [2:1 adduct of 1,3-bis(isocyanatomethyl)cyclohexane to carbon dioxide] obtained in Reference Example 2, 100 parts of hexamethylene diisocyanate, 0.034 part of dibutyltin dilaurate and 42.5 parts of ethyl acetate was reacted at 60° C. for 5 hours to obtain a curing agent having a solid content of 80% and an isocyanate content of 17.1%.

100 parts of said main component was mixed with 3 parts of the above curing agent and 0.12 part of 1,5-diazabicyclo[5,4,0]-5-undecene octylate as a catalyst. Using the resultant mixture a double-side adhesive tape was produced. This tape was allowed to stand at 23° C. and 50% RH for 2 days and then subjected to adhesive tests (Sample C-1).

EXAMPLE 4

A mixture of 35 parts of dipropylene glycol, 40 parts of 1,3-bis(isocyanatomethyl)cyclohexane having oxadiazinetrione ring obtained in Reference Example 2, 60 parts of 3-isocyanatomethyl-3,5,5-trimethylcyclohexyl isocyanate, 0.027 part of dibutyltin dilaurate and 33.8 parts of ethyl acetate was reacted at 60° C. for 6 hours to obtain a curing agent having a solid content of 80% and an isocyanate content of 5.1%.

With 15 parts of this curing agent were mixed 100 parts of the main component obtained in Example 1, 0.17 part of 1,5-diazabicyclo[5,4,0]-5-undecene octylate and 30 parts of ethyl acetate. Using the resultant mixture a double-side adhesive tape was produced. This tape was allowed to stand at 23° C. and 50% RH for 2 days and then subjected to adhesion tests (Sample D-1).

EXAMPLE 5

With 100 parts of the same butadiene homopolymer having hydroxyl groups at both terminals as used in Example 1 were mixed 100 parts of polydipropylene adipate having hydroxyl groups at both terminals (average molecular weight 2,000) and 85.7 parts of ethyl acetate to obtain a main component having a solid content of 70% and a hydroxyl value of 39.3 mg KOH/g.

A mixture of 8 parts of trimethylolpropane, 22 parts of dipropylene glycol, 40 parts of 1,3-bis(isocyanatomethyl)cyclohexane having an oxadiazinetrione ring obtained in Reference Example 2, 0.034 part of dibutyltin dilaurate and 42.5 parts of ethyl acetate was reacted at 60° C. for 5 hours to obtain a curing agent having a solid content of 80% and an isocyanate content of 14.7%.

100 parts of said main component was mixed with 10 parts of the above curing agent and 0.16 part of 1,5-diazabicyclo[5,4,0]-5-undecene octylate as a catalyst. Using the resultant mixture a double-side adhesive tape was produced. This tape was allowed to stand at 23° C. and 50% RH for 2 days and then subjected to adhesion tests (Sample E-1).

Test results are shown in Table 1. The test methods are as follows:

ADHESION

Each of the double-side adhesive tape was cut to 20 mm in width. The first side of thus cut tape was applied to SUS 304 stainless steel sheet and a polyester film (25μ thick) was applied to the second side. This was pressed by reciprocating 8 times a rubber roll of 2 kg thereover and allowed to stand at 23° C. for one hour. Then, this was subjected to 180° peel test at a peeling speed of 300 mm/min at 23° C.

HOLDING POWER

The first side of the sample in an area of 20×20 mm² was applied to an SUS 304 stainless steel sheet and a polyester film (25μ thick) was applied to the second side. This was pressed by reciprocating 8 times a rubber roll of 2 kg thereover. In an atmosphere of 40° C., a static load of 1 kg was applied to one end of the sample tape and time required until the tape was cramped and dropped was measured.

TACKINESS

Tackiness was measured by the ball tack method of J. Dow. That is, the sample was put on a plane inclined by 30° and steel balls of 1/32 to 32/32 inch in diameter were rolled from the point 10 cm from the upper end at 23° C. The tackiness was expressed by the maximum diameter of the steel balls which stopped within 10 cm of the tacky surface.

TABLE 1

|  | Sample No. | Adhesion (g/20 mm) | Holding power (h) | Tackiness |
|---|---|---|---|---|
| Example 1 | A-1 | 1500 | More than 24 hours | 10/32 |
| Example 2 | B-1 | 1400 | More than 24 hours | 8/32 |
| Example 3 | C-1 | 1700 | More than 24 hours | 12/32 |
| Example 4 | D-1 | 1200 | More than 24 hours | 7/32 |
| Example 5 | E-1 | 1300 | More than 24 hours | 8/32 |
| Comparative Example 1 | F-1 | 1400 | 12 | 12/32 |
|  | F-2 | 1800 | 17 | 12/32 |
|  | F-3 | 2000* | 2 | 14/32 |

*The resin remained on the stainless steel sheet.

We claim:

1. A two-package type pressure-sensitive adhesive composition which contains (1) a polyol component having an average molecular weight of about 500 to 100,000 and (2) a polyurethane having terminal free isocyanate group obtained by the reaction of an isocyanate component having oxadiazine-2,4,6-trione ring and a polyol component having an average molecular weight of about 62 to 500 and, if necessary, another organic diisocyanate at such a proportion that the number of oxadiazinetrione ring/the total number of free isocyanate group is in the range of ½ to 1/20 and (the number of oxadiazinetrione ring+the total number of free isocyanate group)/(the number of hydroxyl group of polyol component) is at least 1.0, the proportion of the polyol component (1) to the polyurethane (2) being such that the number of hydroxyl group of polyol component (1)/(the number of free isocyanate group of polyurethane (2)+the number of oxadiazinetrione ring) is in the range of 1.0 to 10.

2. A pressure-sensitive adhesive composition according to claim 1 wherein the polyol component (1) is polyester polyol, polyether polyol, acrylic polyol, polyurethane polyol, polyhydroxyalkane or a mixture thereof.

3. A pressure-sensitive adhesive composition according to claim 1 wherein the isocyanate component having oxadiazine-2,4,6-trione ring is the one prepared by the reaction of an isocyanate compound with carbon dioxide.

4. A pressure-sensitive adhesive composition according to claim 3 wherein the isocyanate compound is an aliphatic or alicyclic polyisocyanate.

5. A pressure-sensitive adhesive composition according to claim 4 wherein the isocyanate compound is hexamethylene diisocyanate, 3-isocyanatomethyl-3,5,6- trimethylcyclohexyl isocyanate or bis(isocyanatomethyl)cyclohexane.

6. A pressure-sensitive adhesive composition according to claim 1 wherein the polyol component to be reacted with the isocyanate component is a low molecular weight polyol.

7. A pressure-sensitive adhesive composition according to claim 1 wherein the organic diisocyanate is an aliphatic, alicyclic or aromatic diisocyanate which is other than the isocyanate component having oxadiazine-2,4,6-trione ring.

8. A pressure-sensitive adhesive composition according to claim 7 wherein the amount of the organic diisocyanate is such that (the total number of isocyanate group of the isocyanate component having oxadiazinetrione ring and the organic diisocyanate)/the number of oxadiazinetrione ring is in the range of 2 to 20.

9. A pressure-sensitive adhesive composition according to claim 1 wherein the proportion of the polyol component (1) to the polyurethane (2) is such that the number of hydroxyl group of polyol component (1)/the number of free isocyanate group of polyurethane (2)+the number of oxadiazinetrione ring) is in the range of 1.2 to 5.

10. A pressure-sensitive adhesion composition according to claim 1 which additionally contains a curing catalyst, tackifier, plasticizer, antioxidant, UV stabilizer and/or pigment.

11. A pressure-sensitive adhesive composition according to claim 1, wherein the number of oxadiazinetrione ring/the total number of free isocyanate group is in the range of 1/5 to 1/15, and (the number of oxadiazinetrione ring+the total number of free isocyanate group)/(the number of hydroxyl group of polyol component) is in the range of 1.2 to 3, the proportion of the polyol component (1) to the polyurethane (2) being such that the number of hydroxyl group of polyol component (1)/(the number of free isocyanate group of polyurethane (2)+the number of oxadiazinetrione ring) is the range of 1.2 to 5.

12. A pressure-sensitive adhesive composition according to claim 1, wherein the polyol component (1) is the one having an average molecular weight of about 1,000 to 10,000.

13. A pressure-sensitive adhesive composition according to claim 1, wherein the polyol component (1) is a polyurethane polyol.

14. A pressure-sensitive adhesive composition according to claim 1, wherein the polyol component (1) is an acrylic polyol.

15. A pressure-sensitive adhesive composition according to claim 1, wherein the polyol component (1) is a polybutadiene polyol.

16. A pressure-sensitive adhesive composition according to claim 6, wherein the low molecular weight polyol is diethylene glycol.

17. A pressure-sensitive adhesive composition according to claim 6, wherein the low molecular weight polyol is dipropylene glycol.

18. A pressure-sensitive adhesive composition according to claim 6, wherein the low molecular weight polyol is a mixture of trimethylol propane and dipropylene glycol.

19. A pressure-sensitive adhesive composition according to claim 7, wherein the aliphatic diisocyanate is hexamethylene diisocyanate.

20. A pressure-sensitive adhesive composition according to claim 7, wherein the alicyclic diisocyanate is 3-isocyanatomethyl-3,5,5-trimethylcyclohexylisocyanate.

21. A pressure-sensitive adhesive composition according to claim 7, wherein the aromatic diisocyanate is tolylene diisocyanate.

* * * * *